(12) United States Patent
Piduri et al.

(10) Patent No.: US 9,990,161 B2
(45) Date of Patent: Jun. 5, 2018

(54) CONSISTENT REPLICATION OF VIRTUAL COMPUTING INSTANCE DATA

(71) Applicant: VMware, Inc., Palo Alto, CA (US)

(72) Inventors: Sudarsan R. Piduri, Campbell, CA (US); Ilia Langouev, Santa Cruz, CA (US)

(73) Assignee: VMware, Inc., Palo Alto, CA (US)

( * ) Notice: Subject to any disclaimer, the term of this patent is extended or adjusted under 35 U.S.C. 154(b) by 341 days.

(21) Appl. No.: 14/573,747

(22) Filed: Dec. 17, 2014

(65) Prior Publication Data

US 2016/0179437 A1 Jun. 23, 2016

(51) Int. Cl.
*G06F 3/06* (2006.01)

(52) U.S. Cl.
CPC .............. *G06F 3/067* (2013.01); *G06F 3/065* (2013.01); *G06F 3/0607* (2013.01); *G06F 3/0659* (2013.01)

(58) Field of Classification Search
CPC ........ G06F 3/0665; G06F 3/067; G06F 3/065; G06F 11/1466; G06F 11/1471; G06F 17/30171; G06F 2201/82; G06F 2201/84; G06F 11/0712; G06F 11/2097; G06F 11/301; G06F 2201/815; G06F 9/45558; G06F 9/45533; G06F 9/52; G06F 9/4856; G06F 2009/45562; H04L 67/1097
USPC .............. 707/639, 634; 711/111, 114; 718/1; 714/4.11
See application file for complete search history.

(56) References Cited

U.S. PATENT DOCUMENTS

| | | | | |
|---|---|---|---|---|
| 7,398,350 | B1 * | 7/2008 | Valiveti | G06F 3/0619 |
| | | | | 711/111 |
| 8,438,247 | B1 * | 5/2013 | Certain | G06F 9/52 |
| | | | | 709/203 |
| 8,667,241 | B2 * | 3/2014 | Kono | G06F 3/0605 |
| | | | | 707/827 |
| 8,775,773 | B2 | 7/2014 | Acharya et al. | |
| 8,850,144 | B1 * | 9/2014 | Natanzon | G06F 11/0712 |
| | | | | 711/162 |
| 9,020,984 | B1 * | 4/2015 | Sorenson, III | G06F 3/0611 |
| | | | | 707/809 |
| 9,256,374 | B1 * | 2/2016 | Aron | G06F 9/52 |
| 9,529,885 | B1 * | 12/2016 | Natanzon | G06F 17/30578 |
| 9,600,206 | B2 * | 3/2017 | Kotagiri | G06F 3/0619 |
| 2011/0246423 | A1 * | 10/2011 | Jess | G06F 11/1466 |
| | | | | 707/639 |
| 2011/0246669 | A1 * | 10/2011 | Kanada | G06F 9/4856 |
| | | | | 709/238 |

(Continued)

*Primary Examiner* — Dennis Truong
(74) *Attorney, Agent, or Firm* — Fish & Richardson P.C.

(57) ABSTRACT

Virtual computing instance data that are stored across multiple storage volumes are replicated in a manner such that the write order is maintained. The frequency of the replication is set so that the recovery point objective defined for the VM data can be satisfied. The replication includes the steps of determining a set of logical storage volumes across which the virtual computing instance issues dependent write IOs, issuing a first command to the virtual computing instance to block new IOs and to block receipt of IO acknowledgements, issuing a command to create replicas of all the logical storage volumes in the set, and then issuing a second command to the virtual computing instance to unblock new IOs and unblock receipt of IO acknowledgements.

17 Claims, 3 Drawing Sheets

(56) References Cited

U.S. PATENT DOCUMENTS

| | | | |
|---|---|---|---|
| 2013/0054932 A1* | 2/2013 | Acharya | G06F 3/0605 |
| | | | 711/202 |
| 2013/0185719 A1* | 7/2013 | Kar | G06F 9/45558 |
| | | | 718/1 |
| 2015/0178106 A1* | 6/2015 | Warszawski | G06F 9/45533 |
| | | | 718/1 |

* cited by examiner

CONSISTENT REPLICATION OF VIRTUAL COMPUTING INSTANCE DATA

BACKGROUND

Storage replication is a data protection strategy in which data objects (e.g., files, physical volumes, logical volumes, file systems, etc.) are replicated to provide some measure of redundancy. Storage replication may be used for many purposes, such as ensuring data availability upon storage failures, site disasters, or planned maintenance. Storage replication may be managed directly between storage systems, such as storage arrays, in an approach referred to as storage-based replication or array-based replication (ABR).

Consistent replication across multiple storage devices, such as LUNs (logical unit numbers), has been traditionally implemented by storage system providers by sequencing write IOs across the storage devices. A group of consistently replicated storage devices is known as a consistency group (CG). CG-based approaches to ensuring replication consistency across multiple storage devices, however, require an extensive upfront effort to setup CGs ahead of time. In addition, the number of CGs that can be defined has a limit (on the order of 10's of groups) imposed by the storage system provider. Accordingly, there is a need in the art for more flexible approaches for consistent replication across multiple storage devices.

DETAILED DESCRIPTION

One or more embodiments provide methods for replicating virtual computing instance data, e.g., virtual machine (VM) data, in a crash-consistent manner. According to one embodiment, a virtualization management module that manages virtual computing instances running on one or more host computers, performs periodic replication of storage volumes provisioned for the virtual computing instances in a crash-consistent manner, i.e., in a manner such that the write order is maintained. The frequency of the replication is set so that the RPO (recovery point objective) defined for the virtual computing instance data can be satisfied.

Figure 1:
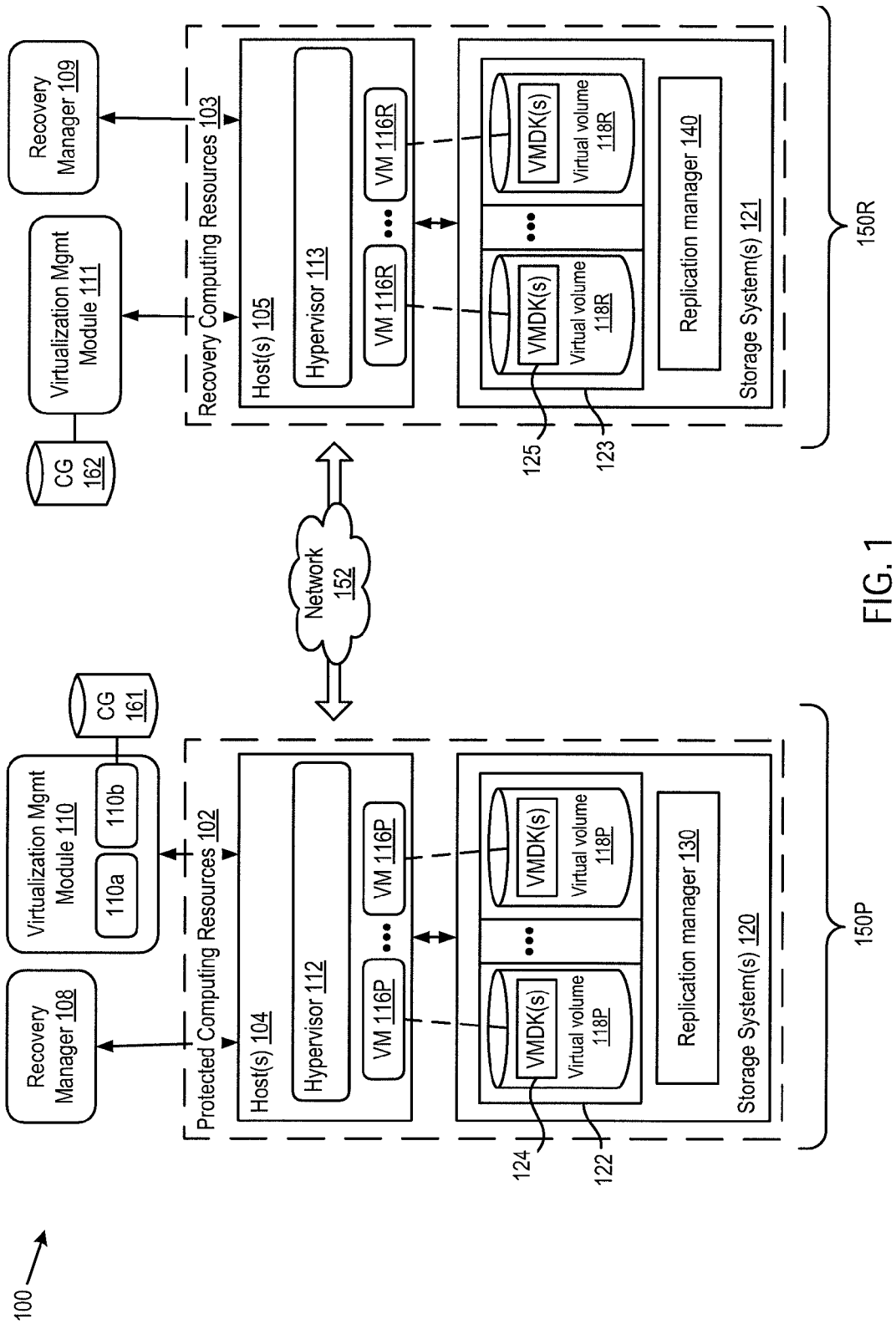
FIG. 1 is a block diagram that illustrates a virtualized computer system in which one or more embodiments may be implemented.

FIG. 1 is a block diagram that illustrates a computer system 100 in which one or more embodiments may be implemented. Embodiments will be described herein in the context of disaster recovery of VMs, but it should be recognized here that the features recited in the claims appended hereto may be implemented in systems configured for other purposes, such as ensuring VM or other virtual computing instance data availability upon storage failures or planned maintenance.

Computer system 100 includes a protected site 150P and a recovery site 150R communicatively connected by a network 152. Sites 150P, 150R include collections of computing resources that are physically and/or logically divided within computer system 100. As used herein, computing resources referred to as "protected" are computing resources, such as virtual machines, for which a duplicate set of computing resources (and data contained therein) is maintained in the event of a system crash or corruption, thereby preventing downtime or even an entire system from being lost due to failure of one or more components. This duplicate set of computing resources may be referred to as "recovery" resources maintained at a recovery site 150R. The process when recovery site 150R takes over operation in place of protected site 150P, for example, after declaration of a disaster, is referred to as a "failover" or a migration. A failback refers to the converse process of restoring services from recovery site 150R back to protected site 150P, for example, after the protected site has been restored and is ready to resume operation.

In one embodiment, protected site 150P includes protected computing resources 102, a recovery manager 108 and a virtualization management module 110. Similarly, recovery site 150R includes recovery computing resources 103, a recovery manager 109, and a virtualization management module 111. Computing resources 102, 103 can include computer systems, storage systems, networks and associated devices, and the like. Protected site 150P may be a datacenter containing protected virtual machines (VMs 116P), executing on protected computing resources 102, for which data is being replicated to recovery site 150R. Protected VMs on recovery site 150R can be failed back to protected site 150P. The terms "failed over" and "failed back" encompass both planned and unplanned migrations of VMs between sites 150P and 150R.

Protected computing resources 102 include one or more host computers (i.e., host(s) 104) that execute one or more hypervisors 112, which include virtual machines (VMs) 116P that are protected. Recovery computing resources 103 include one or more host computers (i.e., host(s) 105) that execute one or more hypervisors 113, which include recovery VMs 116R that will become available after a failover of the corresponding protected VMs. Each of hypervisor 112 and 113 can be a "bare-metal" hypervisor, such as vSphere® ESXi™ commercially available from VMware, Inc. of Palo Alto, Calif. Alternatively, one or more of hypervisor(s) 112 and 113 can execute on top of an operating system (OS), which is executing on a host. Hypervisors 112 and 113 provide a software interface layer that abstracts computing hardware resources into virtualized hardware, enabling sharing of the computing hardware resources among virtual machines. Hypervisor 112 acts as an interface between VMs 116P and protected computing resources 102, and hypervisor 113 acts as an interface between VMs 116R and recovery computing resources 103. Hypervisors 112 and 113 may run on top of an operating system or directly on respective computing resources.

VMs 116P and 116R share hardware resources of protected computing resources 102 and recovery computing resources 103, respectively. Each VM typically includes a guest operating system (OS) and virtualized system hardware (not shown) implemented in software to emulate corresponding components of an actual computer system. VMs 116P are part of protected group(s) of VMs, and hence the computing resources shared by VMs 116P are referred to as "protected computing resources." VMs 116R represent VMs which will become available after a failover or disaster recovery, and hence the computing resources shared by VMs 116R are referred to as "recovery computing resources."

Computer system 100 also includes a virtualization management module 110 that is communicatively coupled to the plurality of hosts 104. In one embodiment, virtualization management module 110 is a computer program that resides and executes in a central server, which may reside in computer system 100, or alternatively, running as a VM in one of hosts 104. One example of a virtualization management module is the vSphere® vCenter™ server made available from VMware, Inc. of Palo Alto, Calif. Virtualization management module 110 is configured to carry out administrative tasks for the computer system 100, including managing hosts 104, managing VMs running within each host 104, provisioning VMs, migrating VMs from one host to another host, load balancing between hosts 104, creating resource pools comprised of computing resources of hosts 104 and VMs 116P, modifying resource pools to allocate and de-allocate VMs and physical resources, and modifying configurations of resource pools. Virtualization management module 111 may be configured similarly.

Each of host(s) 104 is coupled to one or more storage systems 120, and each of host(s) 105 is coupled to one or more storage systems 121. Storage systems 120, 121 can include one or more mass storage devices, associated networks, and the like. In one embodiment, storage systems 120, 121 may be storage arrays, which are storage systems typically containing multiple storage devices (e.g., disk drives, solid state drives containing flash memory devices, or a hybrid of the two), cache memory, and are configured to provide advanced functionality such as RAID, storage virtualization, and array-based replication. Examples of storage arrays include network attached storage (NAS) arrays and storage area network (SAN) arrays.

Storage system 120 has provisioned therein storage volumes that are endpoints of IOs (input-output operations) generated by the VMs. In the embodiments described herein, the storage volumes are provisioned as virtual volumes 118P. Each virtual volume is provisioned by virtualization management module 110 as a storage object and has a configurable storage policy. Further details of virtual volumes are described in U.S. Pat. No. 8,775,773, entitled "Object Storage System," the entire contents of which are incorporated by reference herein. For a VM, a virtual volume may be created for each of the virtual disks and snapshots of the virtual disks, and a separate virtual volume may be created for metadata files of the VM. At storage system 121 of recovery site 150R, virtual volumes 118R, which have been replicated from virtual volumes 118P, are provisioned therein.

Recovery manager 108 is configured to coordinate with a corresponding recovery manager 109 to perform disaster recovery operations on protected computing resources (e.g., VMs 116P, virtual volumes 118P) of protected site 150P using corresponding recovery computing resources 103 (e.g., VMs 116R, virtual volumes 118R) of recovery site 150R. In some embodiments, recovery managers 108, 109 may be executing as a virtual machine or on a physical server (not shown). Recovery managers 108, 109 enable a user to plan the availability of virtual workloads in times of a disaster, for example, by enabling the user to recover their virtual workloads quickly when the production datacenter (i.e., protected site 150P) is unavailable. In one embodiment, recovery managers 108, 109 are configured to orchestrate a planned failover of virtual workloads along with the associated storage across sites 150P and 150R, a test failover of virtual workloads along with the associated storage on the recovery site 150R, or unplanned or disaster failover of virtual workloads along with the associated storage across sites 150P and 150R. An example recovery manager 108 that provides disaster recovery is vSphere® vCenter™ Site Recovery Manager™ commercially available from VMware, Inc. of Palo Alto, Calif.

In the embodiments described herein, the process of replicating virtual volumes 118P at storage system 120 into virtual volumes 118R at storage system 121 is carried out by replication manager 130 communicating with replication manager 140 based on commands from virtualization management module 110, in particular replication control module 110b. The replication control module 110b generates the commands according to a replication schedule managed by a replication scheduling thread 110a in accordance with an RPO defined for the VM data. In some embodiments, the replication may be performed at the host level, e.g., by a module in the host.

Existing array-based or host-based replication techniques are not adequate to address the large number of virtual volumes. More specifically, existing array-based or host-based replication techniques define consistency groups to ensure crash-consistent replication. A "consistency group" is a set of replicated storage volumes, e.g., LUNs or even virtual volumes, for which the write order is preserved during a replication. As such, a consistency group can guarantee that the order of writes within the replica storage volumes will be the same as in the source storage volumes. In a simplified example, when a virtual disk is migrated from storage volume A to another storage volume B at the protected site, the virtual disk is (essentially) written to storage volume B, followed by a deletion of the old copy of the virtual disk at the storage volume A. Using array-based replication, the storage system replicates these write operations to corresponding storage volumes A1 and B1 at the recovery site. If storage volumes A and B are defined to be members of the same consistency group, the storage system ensures that the old copy of the virtual disk in storage volume A1 is not deleted until after the virtual disk has been successfully written to storage volume B1. Otherwise, loss of data might arise if the storage system deletes the old copy of the virtual disk in storage volume A1 before the virtual disk has been written to storage volume B1, resulting in no storage volume having a copy of the virtual disk for a period of time. However, the number of consistency groups that can be defined has a limit (on the order of 10's of groups) imposed by the storage system provider.

Figure 2:
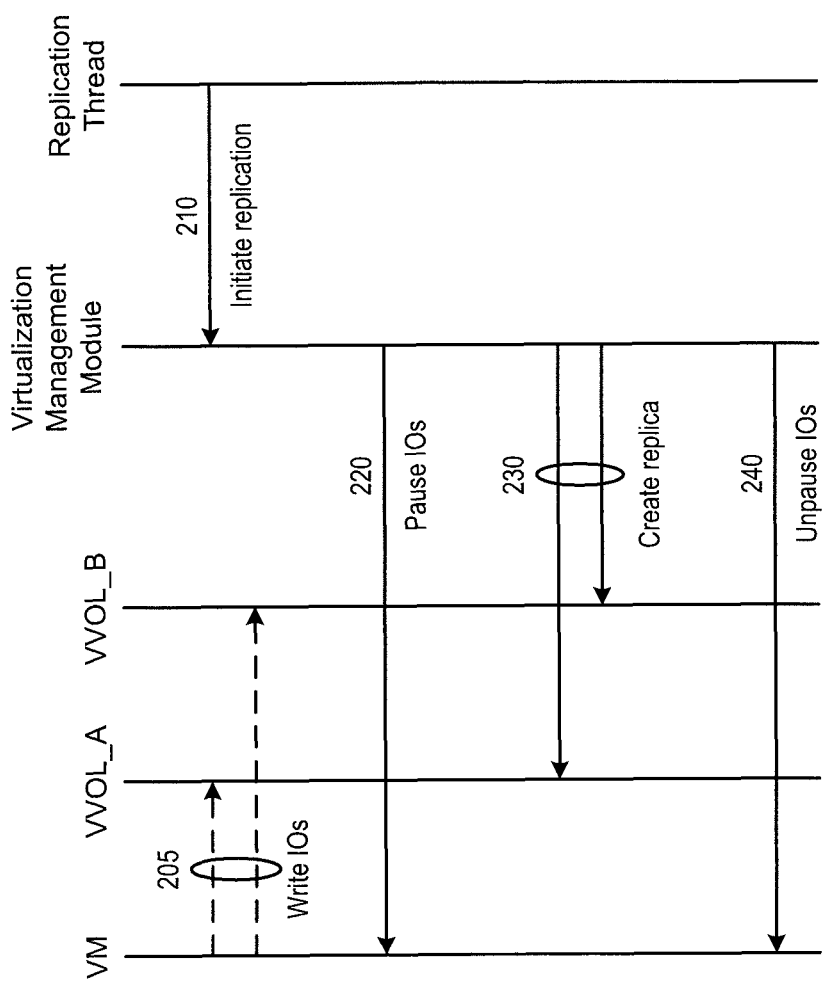
FIG. 2 is a diagram illustrating a flow of commands generated during replication of logical storage volumes targeted by writes from a single virtual machine.
Figure 3:
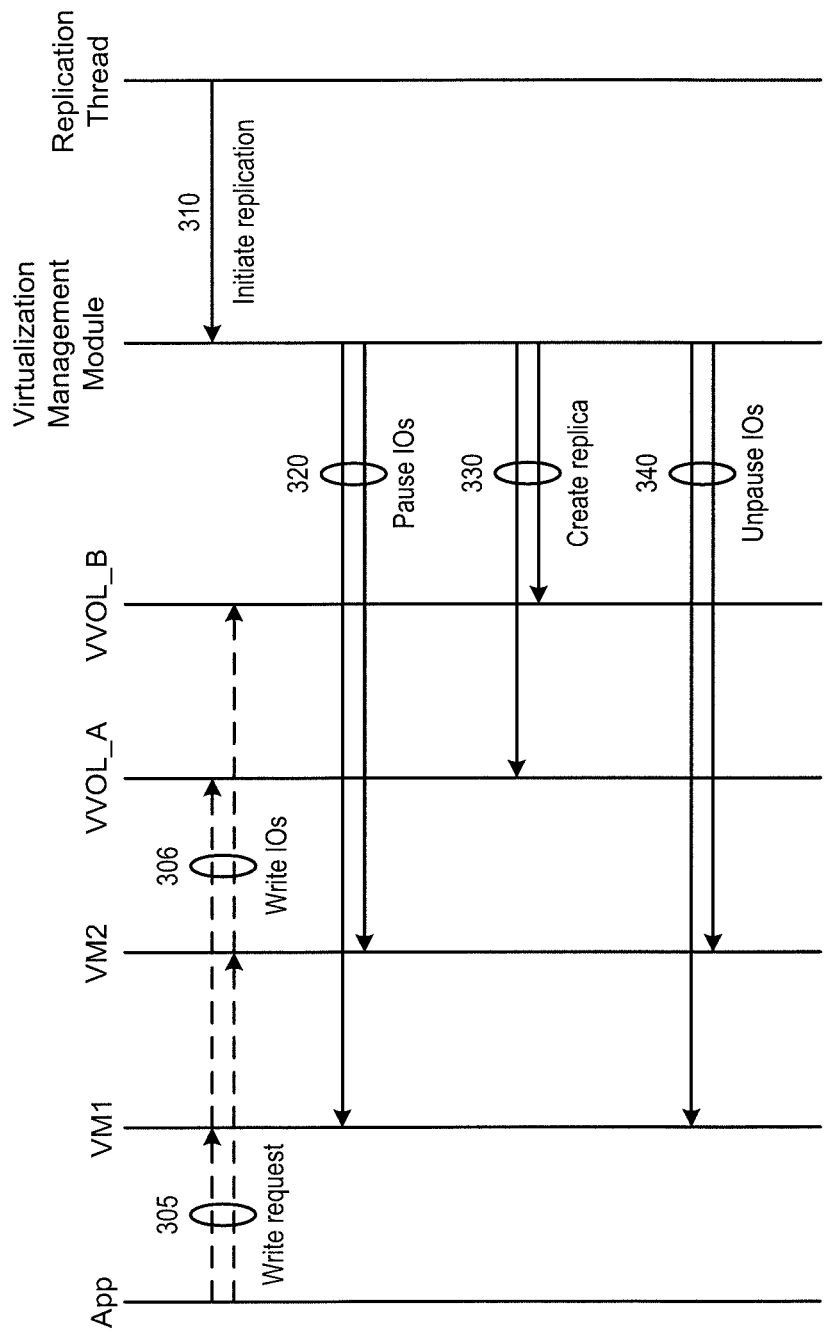
FIG. 3 is a diagram illustrating a flow of commands generated during replication of logical storage volumes targeted by writes from multiple virtual machines.

Accordingly, in the replication techniques according to embodiments described herein, consistency groups are managed by virtualization management module 110 so that any number of consistent groups can be defined. The replication techniques according to the embodiments are illustrated in FIGS. 2 and 3 and described below. FIG. 2 is a diagram illustrating a flow of commands generated by virtualization management module 110 during replication of virtual volumes that are targeted by write IOs from a single VM. FIG. 3 is a diagram illustrating a flow of commands generated by virtualization management module 110 during replication of virtual volumes that are targeted by write IOs from multiple VMs.

In the replication example shown in FIG. 2, a single VM is provided with two virtual disks. Each of the virtual disks is implemented in a different virtual volume, shown in FIG. 2 as VVOL_A and VVOL_B. These two virtual volumes are defined to be members of the same consistency group, which is one of multiple consistency groups maintained in CG store 161 by virtualization management module 110 (and in CG store 162 by virtualization management module 111), so that dependent write IOs issued across the two virtual volumes will be ordered in the same manner in the source virtual volumes 118P as in the replica virtual volumes 118R.

In general, the definitions of which virtual volumes belong to which consistency groups may be made by an administrator of the VMs who has knowledge of potential dependent write IOs being issued across multiple virtual volumes.

Writes from the VM to the virtual volumes are indicated by arrow 205. The arrow 205 is dashed to represent that it is not synchronous with any of the other arrows illustrated in FIG. 2. However, when the VM receives a "Pause IOs" command from virtualization management module 110, the VM is blocked from issuing any IOs.

Replication is carried out according to a replication schedule managed by virtualization management module 110 to ensure compliance with an RPO for the data for the single VM. In the example illustrated in FIG. 2, a replication thread (e.g., replication scheduling thread 110*a*) issues a command to initiate replication as indicated by arrow 210. Upon receiving this command, virtualization management module 110 examines CG store 161 to determine the consistency group to which the virtual volumes containing the VM data belong. In the replication example shown in FIG. 2, it is assumed that VVOL_A and VVOL_B contain the VM data and are members of the same consistency group. Then, virtualization management module 110 issues a command to the VM to pause all IOs (arrow 220). When the VM executes this command, it blocks all new IOs from being issued as well as receipt of all new write acknowledgements that are returned from storage. However, the VM does not wait for all of its in-flight IOs (i.e., IOs issued to storage for which an acknowledgement has not yet been received) to complete. Accordingly, pausing of IOs is different from quiescing of IOs because the latter requires all of the in-flight IOs to complete. Then, virtualization management module 110 issues a command to storage system 120 to replicate the virtual volumes, i.e., to replicate VVOL_A and VVOL_B (arrow 230). As a final step, virtualization management module 110 issues a command to the VM to unpause all IOs (arrow 240). In some embodiments, virtualization management module 110 waits for an acknowledgement that the VM has paused all IOs before issuing the replication command to storage system 120, and waits for an acknowledgement that virtual volume replication has completed before issuing the unpause command.

According to the embodiments, the virtual volume replica creation may be implemented through a set of APIs (application programming interface) exposed by storage system 120. These APIs include the following first through third APIs. The first API is called to prepare the virtual volume for replica creation. In response to this API, the storage system in which the virtual volume is provisioned begins flushing its IO cache so that write data that is targeted for the virtual volume for which a write acknowledgement has been returned already is actually written into the virtual volume. It should be recognized that the first API is an optimization feature. It does not have to be executed in the embodiments. The second API is called to create the replica virtual volume at storage system 121 of protected site 150R. It should be recognized that coordination among virtual volumes belonging to the same consistency group is not necessary when executing this API according to the embodiments described herein. The third API is called to remove the replica virtual volume. This API is called to clean up storage system 121 of protected site 150 when an error occurs in the creation of the replica virtual volume. The error may occur, for example, when the replica creation takes too long as a result of too many IOs being cached and the process times out. It should be recognized that the third API is also an optimization feature. It does not have been to be executed in the embodiments.

In the replication example shown in FIG. 3, a first VM, VM1, which is provided with a virtual disk implemented in VVOL_A, and a second VM, VM2, which is provided with a virtual disk implemented in VVOL_B, are deployed to support an application that carries out a distributed transaction. The application coordinates a sequence of write IOs to the two VMs and the write IOs may be dependent write IOs. When the virtual volumes for the two VMs are replicated, because there exists a possibility of dependent write IOs being issued across the virtual volumes, the virtual volumes are defined to be members of the same consistency group.

Writes issued by the application to the VMs are indicated by arrow 305. These writes trigger write IOs indicated by arrow 306 from VM1 and VM2. The arrows 305 and 306 are dashed to represent they are not synchronous with any of the other arrows illustrated in FIG. 3. However, when VM1 and VM2 receive a "Pause IO" command from virtualization management module 110, the respective VM is blocked from issuing any IOs.

Replication is carried out according to a replication schedule managed by virtualization management module 110 to ensure compliance with an RPO for the data for the multiple VMs that support the application carrying out a distributed transaction. In the example illustrated in FIG. 3, a replication thread (e.g., replication scheduling thread 110*a*) issues a command to initiate replication as indicated by arrow 310. Upon receiving this command, virtualization management module 110 examines CG store 161 to determine the consistency group or groups to which the virtual volumes containing the data of VM1 and VM2 belong. In the replication example shown in FIG. 3, two assumptions are made. The first assumption is that VVOL_A and VVOL_B contain the data of VM1 and VM2 and are members of the same consistency group. The second assumption is that the write IOs are not buffered in the two VMs. Then, virtualization management module 110 issues a command to each of the two VMs to pause all IOs (arrow 320). When the VMs execute this command, they block all new IOs from being issued as well as receipt of all new write acknowledgements that are returned from storage. However, as noted above, the VMs do not wait for all of their in-flight IOs (i.e., IOs issued to storage for which an acknowledgement has not yet been received) to complete. Then, virtualization management module 110 issues a command to storage system 120 to replicate the virtual volumes, i.e., to replicate VVOL_A and VVOL_B (arrow 330). As a final step, virtualization management module 110 at step 340 issues a command to each of the multiple VMs to unpause all IOs (arrow 340).

In the embodiments described above, the storage volume that is replicated after directing the VMs to pause all IOs, is a virtual volume. In alternative embodiments, the storage volume that is replicated after directing the VMs to pause all IOs may be a LUN or any logical storage device. It should be recognized that whatever the selection of the logical storage deice, the consistency groups should be defined in CG store 161 in terms of the unit of the logical storage device being replicated.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A non-transitory computer readable storage medium comprising instructions that cause computer system to carry out a method of replicating data for a virtual computing instance wherein the virtual computing instance and a virtualization management module are running on hypervisor executing on a host computer communicatively coupled to a storage system, said method comprising:

determining, by the virtualization management module, a set of logical storage volumes across which the virtual computing instance issues dependent write IOs wherein the logical storage volumes are provisioned in the storage system;

issuing, by the virtualization management module, a first command to the virtual computing instance to block the virtual computing instance from issuing new IOs to the logical storage volumes of the set of logical storage volumes in the storage system, and to block the virtual computing instance from receiving IO acknowledgements sent by the storage system without waiting for in-flight IOs to complete;

responsive to issuing the first command and before issuing a second command to the virtual computing instance wherein the second command unblocks the virtual computing instance from issuing new IOs to the storage system and unblocks the virtual computing instance from receiving IO acknowledgements sent by the storage system, issuing, by the virtualization module, a command to the storage system wherein the command instructs the storage system to create replicas of all the logical storage volumes in the set to which the virtual computing instance issues dependent write IOs on a second storage system such that the dependent writes of the replicas are ordered in the same manner as the logical storage volumes in the set; and issuing, by the virtualization module, the second command to the virtual computing instance.

2. The non-transitory computer readable storage medium of claim 1, wherein the logical storage volumes are virtual volumes that include a first virtual volume that stores data of a first virtual disk for the virtual computing instance and a second virtual volume that stores data of a second virtual disk for the virtual computing instance.

3. The non-transitory computer readable storage medium of claim 2, wherein each of the virtual volumes has an independent storage policy.

4. The non-transitory computer readable storage medium of claim 1 wherein the virtualization module waits for an acknowledgement from the storage system that replicas have been created before issuing the second command.

5. The non-transitory computer readable storage medium of claim 1, wherein the virtualization management module determines the set of logical storage volumes across which the virtual computing instances issue dependent write IOs in response to the write requests, from consistency group definitions maintained by the virtualization management module.

6. A method of replicating data for a virtual computing instance wherein the virtual computing instance and a virtualization management module are running on hypervisor executing on a host computer communicatively coupled to a storage system, said method comprising:
    determining, by the virtualization management module, a set of logical storage volumes across which the virtual computing instances issue dependent write IOs wherein the logical storage volumes are provisioned in the storage system;
    issuing, by the virtualization module, a first command to the virtual computing instance to block the virtual computing instance from issuing new IOs to the logical storage volumes of the set of logical storage volumes in the storage system, and to block the virtual computing instance from receiving IO acknowledgements sent by the storage system without waiting for in-flight IOs to complete;
    responsive to issuing the first command and before issuing a second command to the virtual computing instance wherein the second command unblocks the virtual computing instance from issuing new IOs to the storage system and unblocks the virtual computing instance from receiving receipt of IO acknowledgements sent by the storage system, issuing, by the virtualization module, a command to the storage system wherein the command instructs the storage system to create replicas of all the logical storage volumes in the set to which the virtual computing instance issues dependent write IOs on a second storage system such that the dependent writes of the replicas are ordered in the same manner as the logical storage volumes in the set; and
    issuing the second command to each of the virtual computing instances.

7. The method of claim 6, wherein the logical storage volumes are virtual volumes that include a first virtual volume that stores data of a virtual disk of one of the virtual computing instances and a second virtual volume that stores data of a virtual disk of another one of the virtual computing instances.

8. The method of claim 7, wherein each of the virtual volumes has an independent storage policy.

9. The method of claim 6, wherein virtualization management module determines the set of logical storage volumes across which the virtual computing instances issue dependent write IOs in response to the write requests, from consistency group definitions maintained by the virtualization management module.

10. The method of claim 6 wherein the virtualization management module waits for an acknowledgement from the storage system that replicas have been created before issuing the second command.

11. The method of claim 6, wherein the creation of replicas comprises using an API to instruct the storage system to flush an IO cache for the logical storage volumes in the set such that write data for the logical storage volumes in the set that has already been acknowledged has been written.

12. The method of claim 6, wherein the creation of replicas comprises using an API to instruct the storage system to remove one or more replicas in response to determining that an error occurred in creating the replica.

13. A computer system comprising:
    a processor; and
    a non-transitory computer readable medium having stored thereon program code for replicating data for a virtual computing instance wherein the virtual computing instance and a virtualization management module are running on hypervisor executing on a host computer communicatively coupled to a storage system, the program code causing the processor to:
    determine, by the virtualization management module, a set of logical storage volumes across which the virtual computing instance issues dependent write IOs wherein the logical storage volumes are provisioned in the storage system;
    issue, by the virtualization module, a first command to the virtual computing instance to block the virtual computing instance from issuing new IOs to the logical storage volumes of the set of logical storage volumes in the storage system, and to block the virtual computing instance from receiving IO acknowledgements sent by the storage system without waiting for in-flight IOs to complete;
    responsive to issuing the first command and before issuing a second command to the virtual computing instance wherein the second command unblocks the virtual computing instance from issuing new IOs to the storage system and unblocks the virtual computing instance from receiving IO acknowledgements sent by the storage system, issue, by the virtualization module, a command to the storage system wherein the command instructs the storage system to create replicas of all the logical storage volumes in the set to which the virtual computing instance issues dependent write IOs on a second storage system such that the dependent writes of the replicas are ordered in the same manner as the logical storage volumes in the set; and
    issue, by the virtualization module, the second command to the virtual computing instance.

14. The computer system of claim 13, wherein the logical storage volumes are virtual volumes that include a first virtual volume that stores data of a first virtual disk for the virtual computing instance and a second virtual volume that stores data of a second virtual disk for the virtual computing instance.

15. The computer system of claim 14, wherein each of the virtual volumes has an independent storage policy.

16. The computer system of claim 13 wherein the virtualization module waits for an acknowledgement from the storage system that replicas have been created before issuing the second command.

17. The system of claim 13, wherein the virtualization management module determines the set of logical storage volumes across which the virtual computing instances issue dependent write IOs in response to the write requests, from consistency group definitions maintained by the virtualization management module.

* * * * *